June 24, 1958   G. K. E. H. STAMPE ET AL   2,840,184
SUPPORT FOR FILTER MATERIAL
Filed Dec. 27, 1954   2 Sheets-Sheet 1

INVENTORS
Hermann O. Tietze
Gerhard K. E. H. Stampe
BY Bailey, Stephens & Huettig
ATTORNEYS

2,840,184

SUPPORT FOR FILTER MATERIAL

Gerhard K. E. H. Stampe and Hermann Otto Tietze, Lubeck, Germany, assignors to Otto Heinrich Drager, Lubeck, Germany Application December 27, 1954, Serial No. 477,847

Claims priority, application Germany January 29, 1954

1 Claim. (Cl. 183—49)

This invention relates to supports for filter material. In particular the invention is directed to a support for air filtering material.

Air filters can be constructed in which the filtering material, such as sand or earth, is poured over an air outlet support composed of inverted V-shaped strips joined to an outlet air duct. The filter material does not clog the duct because the filter material comes to rest at its natural slope angle around the inverted V-shaped strips and thus does not enter the space under the strips. Constructions of this general sort are disclosed in the copending application of Tietze and Stampe, filed November 30, 1954, Serial Number 472,082, for Filter Material Support, now abandoned.

The object of the instant invention is to produce a simplified support which can be easily shipped and assembled.

The means by which this and other objects of the invention are obtained are described more fully with reference to the accompanying drawings, in which.

Figure 1:
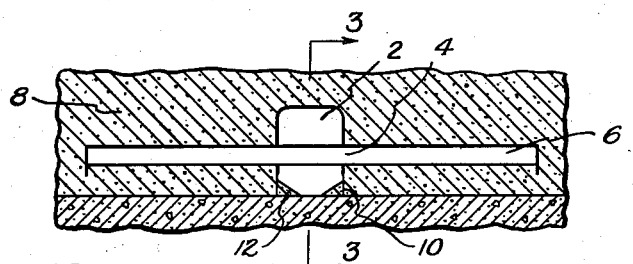
Figure 1 is a cross-sectional view through a filter support.
Figure 2:
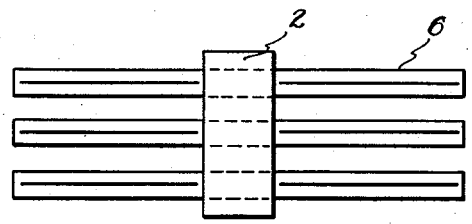
Figure 2 is a plan view of the filter support.
Figure 3:
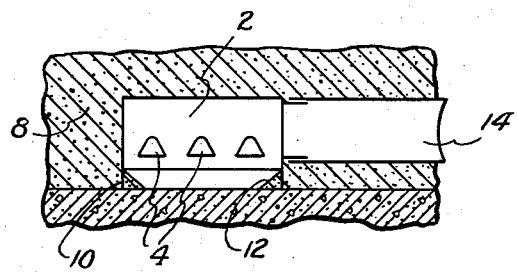
Figure 3 is a cross-sectional view on the line 3—3 of Figure 1.

In Figure 1 the outlet air duct 2 is of rectangular cross section and has triangular pairs of aligned openings 4 in its longitudinal side walls. Slidably mounted in these openings are inverted V-shaped strips 6 which conform to the shape of the openings 4, and extend outwardly from the side walls of the duct 2. Filter material 8, such as sand or earth, is poured over this support and it settles so that the natural slope angle of the material prevents it from entering into the space beneath strips 6.

The duct 2 is provided with legs 10 so that the filter material can partially flow into duct 2 to form piles 12, which again settle according to the natural slope angle of the material. Duct 2 is connected by joint 14 to the outside of the filter.

In operation air passes through the filter material 8 up under the filter strips 6 into duct 2, and then through joint 14 outwardly of the filter.

This is a simple, easily assembled, filter support. The structural parts do not have to be rigidly connected with each other. The strips 6 may project on one side or the other of any length desired. If necessary, the outer ends of the strips 6 may be given additional supports. The formation of the piles 12 provide a larger filter area for the air collected in duct 2.

Figure 4:
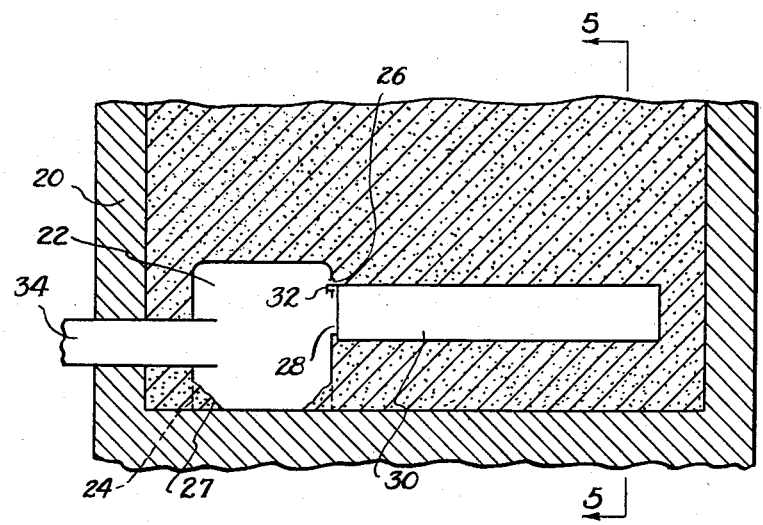
Figure 4 is a cross-sectional view through a modified form of support.
Figure 5:
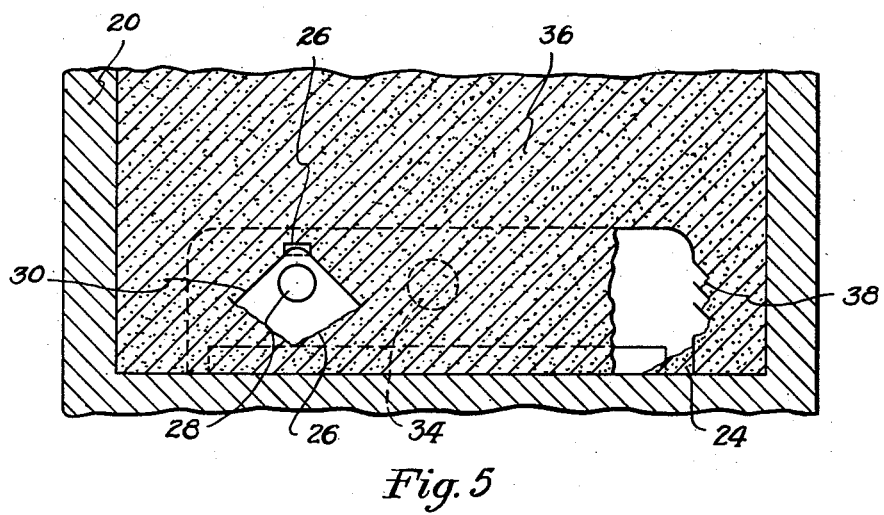
Figure 5 is a cross-sectional view on the line 5—5 of Figure 4.

The modified form of the filter support is shown in Figures 4 and 5. A filter support is shown in a chamber formed by brick walls 20. The air collecting duct 22 is of rectangular cross section and is supported upon legs 24 so that the filter material can form piles 26 according to the natural slope angle of the filter material 8, as described in Figure 1.

The side walls of duct 22 are provided with slots 26, beneath which are openings 28. Inverted V-shaped strips 30 have hook flanges 32 at one end thereof. These strips have their under cross-sectional area greater than the size of openings 28. Hook flanges 32 are inserted through slots 26 in order to hang strips 30 on duct 22. The support communicates with the exterior throughout the pipe 34. As in Figure 1 the filter material settles over and below the strips 30, according to its natural slope angle, but does not clog the space under strip 30. Filtered air passes beneath strips 30 and into duct 22, from which it is withdrawn through pipe 34. A plurality of strips 30 may be hung on the side walls of duct 22. Moreover, the duct 22 can be placed in the center of the chamber, and strips 30 come from both sides thereof. Furthermore, the end of duct 22, as shown in Figure 5, is provided with louvers 38 so inclined as to prevent the filter material from passing therethrough, and provide additional openings for passing filtered air through duct 22.

This again is a simply constructed and easily assembled filter. The strips 30 are supported with sufficient stability under ordinary conditions, and may be given additional support at their free ends. Strips 30 may be arranged in tiers on the side wall of duct 22. Stones may be substituted for legs 24. Also, pipe 34 may be positioned between the lower edge of duct 22 and the ground. In this case the legs or stones should be as large as the outer diameter of pipe 34.

Having now described the means by which the objects of the invention are obtained, we claim:

In an air filter material support for an air raid shelter in which an air duct is seated on the floor of a chamber and is covered on its sides and top by granular filter material so that air can be drawn through the filter material vertically downward and into the air duct which keeps out the filter material but passes purified air, the improvement comprising an air duct having a top wall and side walls, said side walls being partially spaced from the bottom of the chamber, aligned inverted V-shaped openings in said side walls, inverted V-shaped strips slidably mounted through each pair of aligned openings and extending through said air duct and projecting outwardly of said side walls, respectively, and an air outlet pipe connected to said air duct and extending outwardly of said chamber.

References Cited in the file of this patent

UNITED STATES PATENTS

| 793,745 | Shields | July 4, 1905 |
| 1,095,676 | Rigg | May 5, 1914 |
| 1,608,678 | Smith | Nov. 30, 1926 |
| 1,782,823 | Hechenbleikner | Nov. 25, 1930 |

FOREIGN PATENTS

| 391,997 | Germany | Mar. 19, 1924 |
| 437,613 | France | Feb. 23, 1912 |